United States Patent [19]
Dees, Jr. et al.

[11] 3,968,275
[45] July 6, 1976

[54] NON-WOVEN FABRIC FLOOR AND METHOD FOR PRODUCTION

[75] Inventors: Martin Dees, Jr., Lancaster; Debra M. Karcheski, Millersville, both of Pa.

[73] Assignee: Armstrong Cork Company, Lancaster, Pa.

[22] Filed: Oct. 31, 1974

[21] Appl. No.: 519,537

Related U.S. Application Data
[62] Division of Ser. No. 360,837, May 16, 1973, abandoned.

[52] U.S. Cl. ............................. 427/270; 427/267; 427/282; 427/355; 427/366; 427/369; 427/373
[51] Int. Cl.² ..................... B32B 3/26; B05D 3/02
[58] Field of Search ............ 117/38, 15, 45; 161/80, 161/81, 82, 84, 85, 89, 93, 146, 154, 119, 124; 428/300, 159, 158; 427/282, 373, 267, 270, 355, 366, 369

[56] References Cited
UNITED STATES PATENTS

| | | | |
|---|---|---|---|
| 2,920,977 | 1/1960 | Adams | 117/15 |
| 2,943,949 | 7/1960 | Petry | 117/15 |
| 2,961,332 | 11/1960 | Nairn | 117/15 |
| 3,235,935 | 2/1966 | Daruwalls | 161/154 |
| 3,239,365 | 3/1966 | Petry | 117/45 |
| 3,276,904 | 10/1966 | Palmer | 117/45 |
| 3,310,422 | 3/1967 | Petry | 117/15 |
| 3,324,609 | 6/1967 | Stein et al. | 161/81 |

*Primary Examiner*—Michael F. Esposito

[57] ABSTRACT

A non-woven fabric floor having the desirable attributes of a non-woven carpet construction combined with the desirable attributes of a decorative thermoplastic surface covering and a method for its production are described.

12 Claims, 3 Drawing Figures

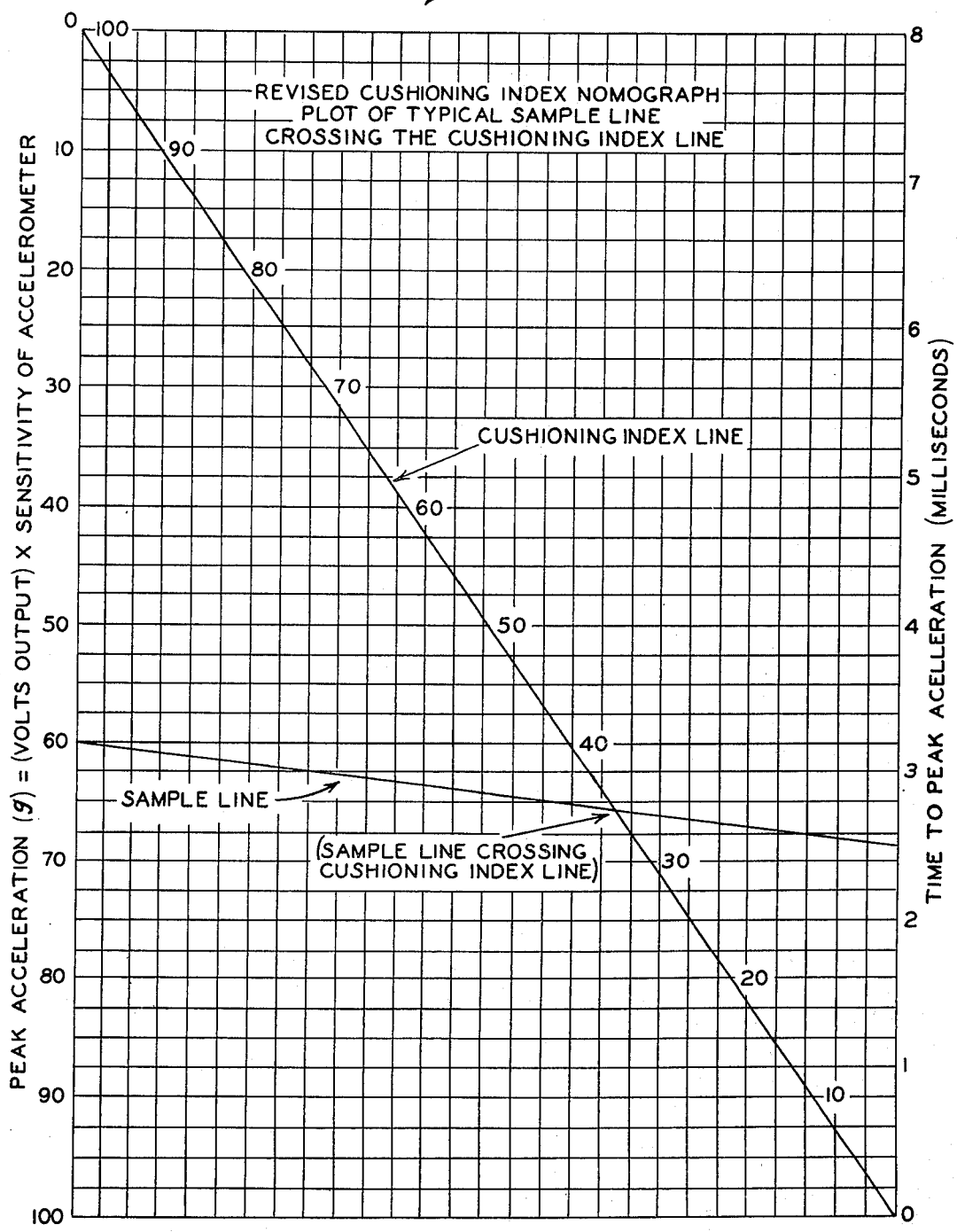

NON-WOVEN FABRIC FLOOR AND METHOD FOR PRODUCTION

CROSS-REFERENCE TO RELATED APPLICATION

This is a division, of application Ser. No. 360,837, filed May 16, 1973 now abandoned.

BACKGROUND OF THE INVENTION

1. Field of the Invention

The subject invention relates to a decorative surface covering.

2. Description of the Prior Art

The use of felt backings for floor coverings is well known. Conventionally resilient thermoplastic decorative floor coverings have been backed with flooring felts of several types. In order to provide more resiliency underfoot, a foamed vinyl or rubber layer have been incorporated in products, either as a backing replacing the felt, as an integral part of the decorative layer itself or as underlayments. In addition, it is known from U.S. Pat. No. 3,490,985 to decorate a glass fabric with a plastisol which may be expanded by using any suitable blowing agent. It is also known from U.S. Pat. No. 2,920,977 to print decorative designs in such a way that some of the elements are foamed, whereas others are of an unfoamed structure.

SUMMARY OF THE INVENTION

Our invention is concerned with the production of a resilient decorative thermoplastic sheet material which also embodies an element in its structure to give an added degree of resiliency. This is achieved by utilizing, as a backing web for the decorative vinyl wear layer, a non-woven, needle-punched mat of fibers which is reinforced with a dimensionally stable scrim. This needle-punched web, which is lofty and resilient, is bonded throughout by a latex binder.

The latex saturated needle-punched web is decorated by printing with non-foamable and/or foamable plastisol inks on a rotary screen printer to form the desired design on the face of the backing web and this layer is then simultaneously pressed and gelled by passing the printed web through a heated laminator whereby a planished, continuous, decorative, gelled layer is formed which is embedded firmly in the needle-punched web with the surface fibers being locked therein. A thin non-porous plastisol clear coat is then applied, and the coated fabric is passed through an oven where the decorative and wear coatings are fused and any design elements formed of foamable material are foamed.

BRIEF DESCRIPTION OF THE DRAWINGS

FIG. 3 is a typical nomograph used in determining a cushioning index.

DESCRIPTION OF THE PREFERRED EMBODIMENTS

Figure 1:
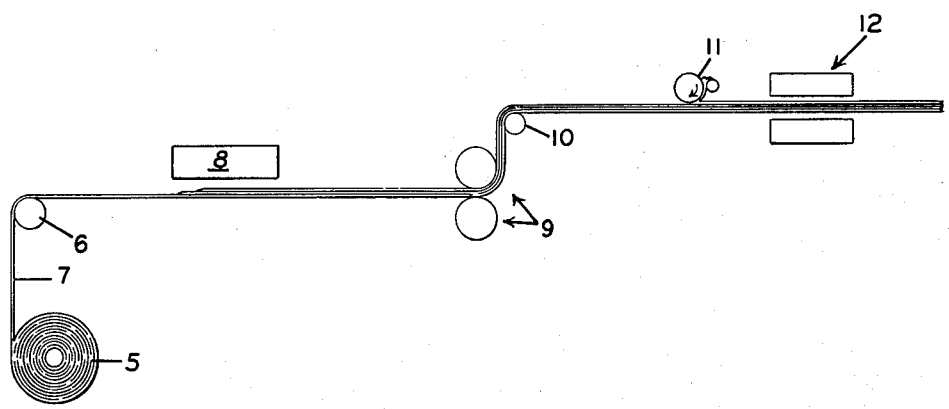
FIG. 1 is a diagrammatic illustration of the process of preparing the decorative sheet material in accordance with our invention.

To form the needle-punched backing met or web, a woven glass scrim or other dimensionally stable woven or non-woven scrim is sandwiched between two non-woven webs of synthetic organic fibers and the sandwich construction is needle-punched using a conventional needle loom and providing between about 200 and 300 penetrations per square inch. Generally, the needle penetrations are to a depth of at least one-fourth inch and may pass through the web. Any organic fibers having deniers of from about 3 to 40, preferably between about 5 and 17; lengths of 1½ to 6 inches, preferably between about 2 and 3 inches; and melting points in excess of about 280° F. may be used in the non-woven webs. Using non-woven webs which together with the scrim have a total weight of from approximately 4 to about 20 ounces and typically between 9 and 11 ounces forms a backing giving the required degree of resiliency underfoot to the finished product.

Among the synthetic organic fibers which may be used in forming the non-woven webs are staple fibers formed of polyester, acrylic, acetate, rayon or nylon.

The needle-bonded backing is then saturated with a latex solution by conventional methods such as spraying the latex onto the web or using a waterfall technique. The saturated web is then dried using steam-heated drums, can driers, or an air impingement oven. Pressing may be done as desired.

Conventional water emulsion latexes, many of which are readily available commercially, may be used. By way of example, acrylic water emulsions such as Rhoplex HA8 (Rohm and Haas) or a stabilized poly(vinyl chloride) water emulsion work well, the only criterion being that the latex should have a heat stability greater than about 280° F. Generally speaking, a weight pickup of 3 to 30 percent based on the weight of the needled backing web is sufficient to form a well-bonded backing.

The needle-bonded mat or web forms the carrier for the decorative wear layers. The decorative wear layer is applied by means of a conventional rotary screen printer, such as a Zimmer printer, utilizing foamable or non-foamable plastisol inks applied by means of, for example, 40 to 60 mesh pattern screens and 1⅛ inch steel ruled rods or foam-covered rods in the printing cylinders. A series of designs is laid down on the web by a successive number of screens to form an aesthetic design of the desired configuration. One may form all of the design elements utilizing conventional non-foamable plastisol inks, or one may, if desired, form elements in the overall design with foamable plastisol inks or any combination thereof.

A preliminary coat, if desired, is also applied at the printer using a non-patterned 40 mesh screen with a three-fourths inch steel squeegee rod prior to printing the design. The plastisol layer or layers are then gelled by contact with a steam-heated (280° F.) laminator roll with a sufficient wrap to provide a 3 to 10 second contact time. The roll also acts to smooth and close the face preparatory to application of a subsequent wear layer coating. Generally speaking, application rates for the first coat of 5 to 10 ounces of plastisol per square yard and for the decorative layer of 8 to 30 ounces of plastisol per square yard form a decorative layer of the desired structure.

The mat with the faced printed surface is then coated with 5 to 20 mils of clear plastisol using a reverse roll coater. The coating is cured and the inks forming the decorative layer fused in a hot-air impingement oven and, in those instances where foamable inks are used for some or all of the design elements, the curing and fusion is accompanied by expansion of the foamable inks. No subsequent facing or embossing is required, and the resultant product has a closed face with a textured surface as well as a pattern emboss if a combination of foamable and non-foamable inks is used. Of course, if desired, the fused decorative wear layer construction may be embossed in a separate operation before or after the clear coat application.

The following example will serve to illustrate this invention:

EXAMPLE 1

Preparation of Carrier

A needled web was formed by needling two nonwoven webs formed of crimped polyester fibers (Avlin 101-FMC Corp.) of 6 denier and about 2½ inches in length, into a woven glass fiber scrim sandwiched therebetween using a conventional needle loom with 294 needle penetrations per square inch. the fiber web weight for the needle-punched backing thus formed was 8 ounces per square yard. The needle-punched web was then saturated by spraying on a latex binder of the following formulation to a weight pickup of solids of about 10 percent by weight of the web and the web pressed and dried in a conventional air impingement oven at about 300° F.

Latex for Web Saturation

| | Parts By Weight |
|---|---|
| Acrylic Emulsion (Rohm & Haas Rhoplex HA8) 45% Solids in Water | 20.9 |
| Water | 23.9 |
| Ammonium Chloride (Rohm & Haas Catalyst A) | 0.05 |
| Fatty Acid Type Defoamer (Nopco NDW) | 0.1 |
| Alkyl Aryl Ether Surfactant (Triton CF10) | 0.1 |

Pattern Formation

With reference to FIG. 1 of the drawings which diagramatically illustrates the formation of a resilient decorative floor covering in accordance with this invention, a latex-bonded needle-punched web 7 produced as above described is unwound at 5 and passed over an idler roll 6. A preliminary coat was first applied by the first printing screen of a Zimmer Rotary Printer indicated by the box 8 using a non-patterned 40 mesh screen with a three-fourths inch steel squeegee rod. The backing web 7 is then decorated by printing a pattern with foamable and non-foamable plastisol inks on the Zimmer Rotary Screen Printer 8 using a series of 40 to 60 mesh screens with 1⅛ inch steel rods positioned in the screens. The first screen provides a continuous coat of about 9 ounces per square yard and the initial design print coat is approximately 12 ounces per square yard. The screens are so patterned as to give a design covering the surface of the carrier web 7. The preliminary and design coats are gelled by passing between heated laminating rolls 9 and by contact through a 90° wrap with one of the heated (280° F.) laminating rolls 9 for 6 seconds. The laminating rolls 9 also act to smooth and close the printed decorative facing layer for subsequent coating. The following formulations are utilized for the inks and clear coatings:

Plastisol Ink (as Foamable)

| | Parts By Weight |
|---|---|
| Poly(Vinyl Chloride) Homopolymer Resin Exon 605 | 50.0 |
| Poly(Vinyl Chloride) Homopolymer Resin Geon 124 | 50.0 |
| DOP Di-2-Ethyl Hexyl Phthalate | 33.8 |
| TXIB Texanol Isobutyrate | 16.9 |
| TXIB 5245 Stabilizer (Ba-Cd Type) | 2.5 |
| Kempore SD60 (Azodicarbonamide Paste) | 12.0 |
| Cab-O-Sil - Silica Thickener | 0.63 |
| Pigment | (as desired) |

Plastisol Ink - Non-Foamable

| | Parts By Weight |
|---|---|
| Poly(Vinyl Chloride) Homopolymer Resin Tenneco 1732 | 50.0 |
| Poly(Vinyl Chloride) Homopolymer Resin Exon 654 | 50.0 |
| DOP Plasticizer | 41.6 |
| TXIB Plasticizer | 15.8 |
| Ferro 5245 Stabilizer | 2.0 |
| Drapex 4.4 Epoxy Stabilizer | 5.8 |
| Cab-O-Sil Thickener | 0.36 |
| Pigment | (as desired) |

Plastisol Clear Coat

| | Parts By Weight |
|---|---|
| Poly(Vinyl Chloride) Homopolymer Resin Exon 605 | 50.0 |
| Poly(Vinyl Chloride) Homopolymer Resin Blacar 1732 | 50.0 |
| DOP Plasticizer | 37.5 |
| TXIB Plasticizer | 23.9 |
| Mark 275 Tin Stabilizer | 2.9 |
| Atlas G695 Surfactant - Thickener | 0.75 |
| Cab-O-Sil Thickener | 0.63 |

Figure 2:
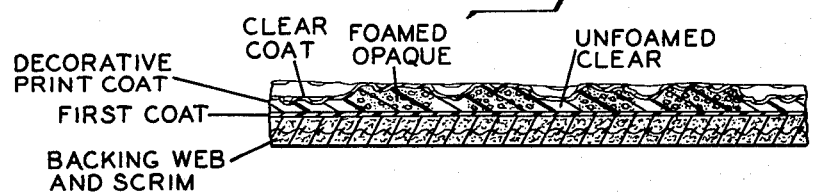
FIG. 2 is a cross-sectional view illustrating a typical sheet produced in accordance with our invention.

The mat with the faced, printed surface is then passed over an idler roll 10 and coated with 10–12 mils of clear plastisol of the above formulation utilizing a reverse roll coater 11. All of the coatings are then cured, accompanied by expansion of the foamable inks, in a hot-air impingement oven 12 (at 410° F.). Dwell time in the oven is approximately 1.5 to 2 minutes. No subsequent facing or embossing is required, although a subsequent embossing of the fused product could be utilized if desired. The resultant product, as shown in cross section in FIG. 2, has a closed face with a textured surface as well as a pattern emboss resulting from the use of the combination of foamable and non-foamable inks.

The use of foamable inks in the practice of this invention is, of course, optional and some texture is attained where only non-foamable inks are utilized due to the texture of the needle-punched carrier. Design elements may be formed from clear or translucent inks, in which case the needle-punched backing may be visible, or of opaque inks which would completely hide the backing. The ink formulations set forth above are clear formulations to which desired pigments are added to give opaque or transluscent characteristics to selected printed elements.

EXAMPLES 2–5

In order to evaluate the relative resiliency of products produced in accordance with this invention, a series of needle-punched reinforced backing webs of 4, 8, 12 and 16 ounces, respectively, were produced. Each of the backing webs was saturated (10 percent solids) with a latex of the following formulation and dried:

Latex for Web Saturation

| | Parts By Weight |
|---|---|
| Acrylic Emulsion (Rohm & Haas Rhoplex HA24) 44.5% Solids in Water | 15.0 |
| Acrylic Emulsion (Rohm & Haas Rhoplex TR-4070) 45.5% Solids in Water | 15.0 |
| Water | 90.0 |
| Ammonium Chloride (Rohm & Haas Catalyst A) | .03 |
| Fatty Acid Type Defoamer (Nopco NDW) | .01 |

Latex for Web Saturation-continued

| | Parts By Weight |
|---|---|
| Dioctyl Sodium DSulfosuccinate (Triton GR-5) | .03 |

The saturated webs were first printed with a continuous plastisol coat (9 ounces per square yard) of the following formulation:

| | Parts By Weight |
|---|---|
| Blacar 1732 Poly(Vinyl Chloride) Homopolymer Resin | 57.14 |
| Borden UC-285 PVC Copolymer Resin | 42.85 |
| DOP Plasticizer | 33.67 |
| TXIB Texanol Isobutyrate Plasticizer | 10.36 |
| Ferro 5245 Stabilizer | 2.50 |
| Drapex 4.4 Epoxy Stabilizer | 5.00 |
| Cab-O-Sil | .66 |
| Pigment | (as desired) |

A second continuous coat (12 ounces per square yard) was applied using a foamable plastisol of the following formulation:

| | Parts By Weight |
|---|---|
| Exon 605 Poly(Vinyl Chloride) Homopolymer Resin | 37.99 |
| SCC-20 PVC Homopolymer Resin | 36.52 |
| M-70 Homopolymer Blending Resin | 25.57 |
| DOP Di-2-Ethyl Hexyl Phthalate Plasticizer | 53.11 |
| Drapex 4.4 Epoxy Stabilizer | .99 |
| Ferro 5245 Stabilizer BA-Cd Type) | 1.99 |
| Kempore AF (Azodicarbonamide) | 2.41 |
| Cab-O-Sil Silica Thickener | .60 |
| Pigment | (as desired) |

These coats were then gelled by passing the coated webs between heating laminating rolls (280° F.) and by contact for about six seconds with one of the heated rolls. A plastisol clear coat of about 10 mils was applied with a reverse roll coater. The clear coat was of the following formulation:

| | Parts By Weight |
|---|---|
| Blacar 1738 Poly(Vinyl Chloride) Homopolymer Resin | 44.89 |
| Exon 6337 Poly(Vinyl) Chloride) Homopolymer Resin | 14.86 |
| Tenneco 501 Homopolymer Blending Resin | 40.24 |
| DOP Plasticizer | 17.46 |
| Santicizer 160 (Butyl Benzyl Phthalate Plasticizer | 7.92 |
| Drapex 4.4 Stabilizer | .99 |
| Nuodex U-1366 Stabilizer | 2.97 |
| TXIB Plasticizer | 14.86 |
| Tinopal SFG | .005 |

All of the coatings were then cured accompanied by expansion of the foamable layer in a hot-air impingement oven (410° F.) with a dwell time of about 1.5 minutes.

The thus prepared products were then subjected to test procedures to determine their cushioning index under standard conditions and to compare these values with values for conventional floor products commercially available.

A special Cushioning Test Apparatus was utilized for all tests reported below and comprised a Storage oscilloscope, cathode follower, a dropping device consisting of a steel cylinder projectile with one end slightly rounded (3 inch radius of curvature) weighing 357 grams, a Columbia Research Laboratory Accelerometer (Ser. No. 1432) attached to the projectile and a clear acrylic tube provided with slotted openings to provide guidance, a solid steel substrate on which the specimen is positioned, and an electromagnet to hold the projectile until release. Necessary interconnecting cables and an aluminum base section designed to support the assembly are provided.

To determine the Cushioning Index of the products, a specimen is placed on the steel substrate and the projectile released by cutting power to the electromagnet. The projectile is allowed to freely fall a prescribed drop height of 1.75 inches and squarely strike the specimen with the rounded end. The impact signal is picked up by the accelerometer and fed to the cathode follower and, in turn, relayed to the Storage oscilloscope screen which is set for a single sweep operation (rebounds are not indicated). The values of peak acceleration and time to peak acceleration are taken from the oscillogram and plotted on a nomograph so the cushioning index can be read off when the peak acceleration and time to peak acceleration are known. FIG. 3 of the drawings shows a nomograph with the sample line plotted for the specimen having a 12 ounce per square yard needle-punched web backing.

The cushioning index for each of the floor products produced as above described are set forth in Table I.

Table I

| Material | Acceleration | Time (Milliseconds) | Cushioning Index |
|---|---|---|---|
| 4 oz. backing | 190.00 | .75 | 4.7 |
| 8 oz. backing | 108.00 | 2.00 | 18.7 |
| 12 oz. backing | 60.00 | 2.50 | 34.2 |
| 16 oz. backing | 80.00 | 2.00 | 23.8 |

A standard vinyl composition sheet flooring (60 mil fused vinyl composition wear layer bonded to a rubber saturated asbestos fiber felt) and a standard linoleum sheet flooring (50 mil cured linoleum wear layer bonded to a 40 mil drying oil saturated cellulosic fiber felt) had cushioning indexes of between about 1.1 and 1.5 when tested as above described. A 15.36 ounce per square yard non-woven needle-punched polypropylene fiber carpet reinforced with a polypropylene scrim had a cushioning index of about 25.9. Foamed rotovinyl sheet flooring products (10 mil clear coat, 30 to 35 mil foamed layer and 30 mil rubber saturated asbestos fiber felt backing) had cushioning indexes of from 2.8 to about 6. Another cushioned flooring (40 mil fused vinyl composition wear layer reinforced with a saturated woven fiber glass scrim and bonded to a 125 mil cellular vinyl composition backing) had a cushioning index of between 21.9 and 29.5.

As shown by the above, the decorative surface coverings produced in accordance with this invention may be designed so as to have superior cushioning properties or properties comparing favorably to commercially available sheet vinyl composition flooring and to the cushioning properties of non-woven needle-punched carpets.

What is claimed is:

1. A method of forming a decorative thermoplastic vinyl composition surface covering having a non-woven, dimensionally stable scrim reinforced, needle-punched backing layer comprising:
   a. Screen printing a backing, having a weight of about 8 ounces per square yard or greater, and bonded with from about 3 to 30% by weight latex, with plastisol inks to form a design on the face of the backing;

b. Pressing and gelling the decorative coating to form a continuous gelled decorative layer which is firmly embedded in the backing, the surface fibers of the backing being embedded within the gelled decorative layer;

c. Applying a thin, non-porous, plastisol clear coat; and d. Heating to fuse the plastisol coatings.

2. A method in accordance with claim 1 wherein the non-woven webs used in forming the needle-punched backing are formed of synthetic organic staple fibers having deniers of from about 3 to 40, lengths of about 1½ to 6 inches and melting points in excess of about 280° F.

3. A method in accordance with claim 2 wherein the needle-punched backing is bonded throughout with from about 3 to 30 percent by weight latex solids based on the weight of said backing.

4. A method in accordance with claim 1 wherein a preliminary continuous plastisol coat of from 5 to 10 ounces per square yard is applied prior to printing a decorative layer of 8 to 30 ounces per square yard.

5. A method in accordance with claim 3 wherein a preliminary continuous plastisol coat of from 5 to 10 ounces per square yard is applied prior to printing a decorative layer of 8 to 30 ounces per square yard.

6. A method in accordance with claim 1 wherein the plastisol inks are selected from the group consisting of foamable inks, non-foamable inks and mixtures thereof.

7. A method in accordance with claim 6 wherein one or more of the plastisol inks are clear or translucent whereby the backing in the fused product is viewable therethrough.

8. A method in accordance with claim 3 wherein the plastisol inks are selected from the group consisting of foamable inks, non-foamable inks and mixtures thereof.

9. A method in accordance with claim 5 wherein the plastisol inks are selected from the group consisting of foamable inks, non-foamable inks and mixtures thereof.

10. A method in accordance with claim 1 wherein the decorative plastisol coating is simultaneously pressed and gelled by passing the printed backing through a heated laminator.

11. A method in accordance with claim 8 wherein the decorative plastisol coating is simultaneously pressed and gelled by passing the printed backing through a heated laminator.

12. A method in accordance with claim 9 wherein the decorative plastisol coating is simultaneously pressed and gelled by passing the printed backing through a heated laminator.

* * * * *